United States Patent [19]

Feiber et al.

[11] Patent Number: 4,611,846

[45] Date of Patent: Sep. 16, 1986

[54] GRIPPER HEAD

[75] Inventors: Wolfgang E. A. Feiber, Harrisburg; Sammie G. Keahey, Landenberg; James R. Kunkle, Enola, all of Pa.

[73] Assignee: AMP Incorporated, Harrisburg, Pa.

[21] Appl. No.: 663,790

[22] Filed: Oct. 23, 1984

[51] Int. Cl.[4] ............................................... B25B 1/02
[52] U.S. Cl. ........................................ 294/88; 269/25; 269/156; 294/119.1; 414/737; 414/741; 414/744 R; 414/752; 901/37; 901/40
[58] Field of Search ............... 414/729, 730, 741, 737, 414/744, 752; 901/31, 37, 39, 40; 188/67, 70 R, 265, 343; 294/88, 119.1; 269/25, 156; 192/17 R

[56] References Cited

U.S. PATENT DOCUMENTS

| | | | |
|---|---|---|---|
| 3,586,176 | 6/1971 | Rackman et al. | |
| 3,620,095 | 11/1971 | Dane | 74/469 |
| 3,700,274 | 10/1972 | Paschal et al. | 294/63 R |
| 3,741,517 | 6/1973 | Pogonowski | 269/156 X |
| 3,777,902 | 12/1973 | Potter | |
| 3,905,632 | 9/1975 | Caylor et al. | 294/119.1 |
| 4,007,815 | 2/1977 | Acre | 188/67 X |
| 4,042,122 | 8/1977 | Espy et al. | 414/741 X |
| 4,062,219 | 12/1977 | Chuparov et al. | 72/422 |
| 4,179,783 | 12/1979 | Inoyama | 29/281.5 |
| 4,261,609 | 4/1981 | Kraszewski et al. | 414/729 X |
| 4,273,506 | 6/1981 | Thomson et al. | 901/31 X |
| 4,437,232 | 3/1984 | Araki et al. | 414/730 X |
| 4,502,571 | 3/1985 | F'Geppert | 188/67 |
| 4,545,722 | 10/1985 | Cutkosky et al. | 901/37 X |

FOREIGN PATENT DOCUMENTS

| | | |
|---|---|---|
| 2833627 | 2/1980 | Fed. Rep. of Germany . |
| 2930006 | 2/1981 | Fed. Rep. of Germany ........ 901/31 |
| 2538745 | 12/1982 | France . |
| 2041262 | 9/1980 | United Kingdom . |
| 2101078 | 1/1983 | United Kingdom . |

OTHER PUBLICATIONS

Robotics Age, May 1985, "Tool-Changing Robot Hands", pp. 27-31.

Primary Examiner—Joseph E. Valenza
Assistant Examiner—Lyle Kim
Attorney, Agent, or Firm—Thomas G. Terrell

[57] ABSTRACT

A gripper head for attachment to the Z axis shaft of a robot or a pick and place machine to pick up objects and position them on a workpiece, comprises a body from which projects a pair of gripping jaws which are slidable horizontally relative to the body by first and second pneumatic piston and cylinder units, respectively. A hold down and tamper member is vertically movable between the jaws by a third piston and cylinder unit so as to hold down an object to be picked up while the jaws are being closed about it and to tamp the object down against the workpiece. A brake is provided for stopping the piston of one of the first and second piston and cylinder units in a desired position. The hold down and tamper member may be arranged also to act as a vacuum pick up device.

17 Claims, 14 Drawing Figures

GRIPPER HEAD

This invention relates to a gripper head for use in picking up objects and placing them in predetermined positions. In use, such a gripper head may be attached to the Z axis shaft, that is to say that shaft which is moved along a vertical axis, of a robot or a pick and place machine.

Robots and pick and place machines are commonly used in industrial production for transporting objects from pick-up stations to a workpiece and assembling them thereto in accordance with a predetermined program, usually under the control of a microprocessor which ensures correct sequential operation of the parts of the machine and of the gripper head.

In many cases, for example, where electrical components are to be assembled to a printed circuit board, the objects to be assembled in accordance with a given program are of various different shapes and sizes. Also, robot or pick and place machines, in particular robots, usually operate at high speeds so that considerable momentum may be imparted to an object during its transportation by the machine.

The invention is intended to provide a gripper head which is capable, in cooperation with robot or a pick and place machine, of picking up and placing upon a workpiece at accurately predetermined positions, objects of varying dimensions, and which can be operated according to a plurality of modes.

The gripper head of the present invention comprises a body arranged for attachment to the Z axis shaft of a robot, or, where a pick and place machine does not have a Z axis shaft, to a piston rod of a piston and a cylinder unit attached to an arm of the machine so that the piston rod performs the function of a Z axis shaft. On its lower side, the body has a pair of jaws for use in picking up and placing objects, each jaw being drivable in an opening and a closing direction relative to the body, by means of a discrete, double acting, piston and cylinder unit, these units being arranged in the body, in spaced, opposed relationship. A hold-down and tamper member is moveable between the jaws for the purpose of holding down an object to be gripped there between and for urging it against the workpiece during the placing operation. The hold down and tamper member, which may be associated with an evacuable chamber, so as also to act as a vacuum pick-up device, may be driven by a further piston and cylinder unit disposed between the piston and cylinder units for driving the jaws. In order to ensure that the position of the object, when grasped by the jaws, cannot be altered as a result of momentum imparted to the object as a result of rapid transportation of the gripper head by the robot or pick and place machine, means are provided for retaining at least one of the jaws in a fixed position along its path of travel relative to the body.

The jaws are preferably provided with exchangeable inserts for engaging an object to be gripped and, are preferably, themselves, also exchangeable, thereby to enhance the versatility of the gripper head. Said jaw retaining means may comprise a brake which can be applied to a piston rod of the piston and cylinder unit for driving that jaw.

The piston and cylinder units for driving the jaws, may be fed with pressure fluid through common lines, the pressure fluid circuit thus acting to equalize the pressure in the cylinders of these units.

Means are preferably provided for adjustably limiting the length of travel of each jaw, in both directions. Means are also preferably provided for sensing the level of the hold down and tamping member when it is in its down position, to ascertain whether an object has been correctly placed on the workpiece. If it has not, a malfunction signal may be generated to cause the jaws to grip the object again, the robot or pick and place machine to transport the gripper head to a waste discharge station, and the jaws then to release the object.

For a better understanding of the invention and to show how it may be carried into effect, reference will now be made, by way of example, to the accompanying drawings in which.

Figure 1:
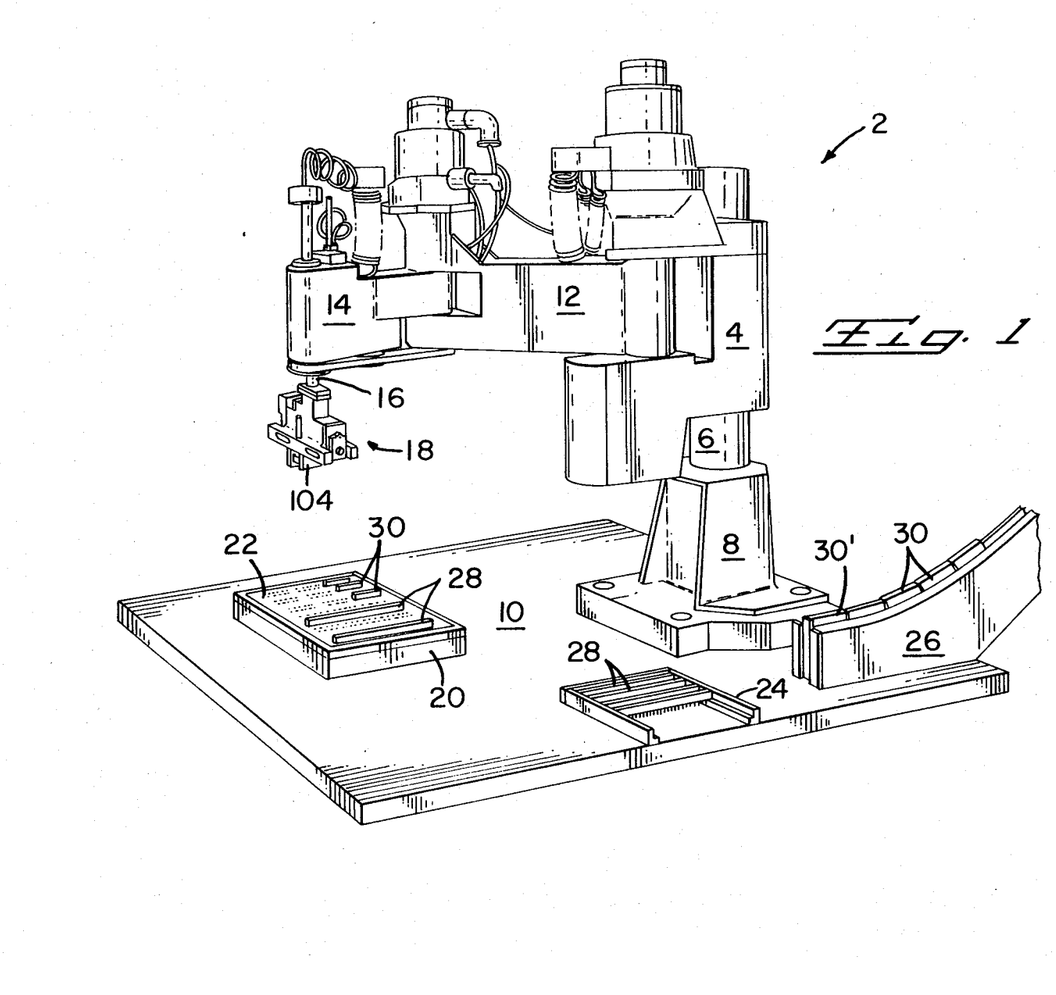
FIG. 1 is a diagrammatic perspective view of an IBM 7535 Scara type robot machine having a gripper head according to an embodiment of the invention, the machine being shown in use in the assembly of electrical connectors to a printed circuit board.
Figure 2:
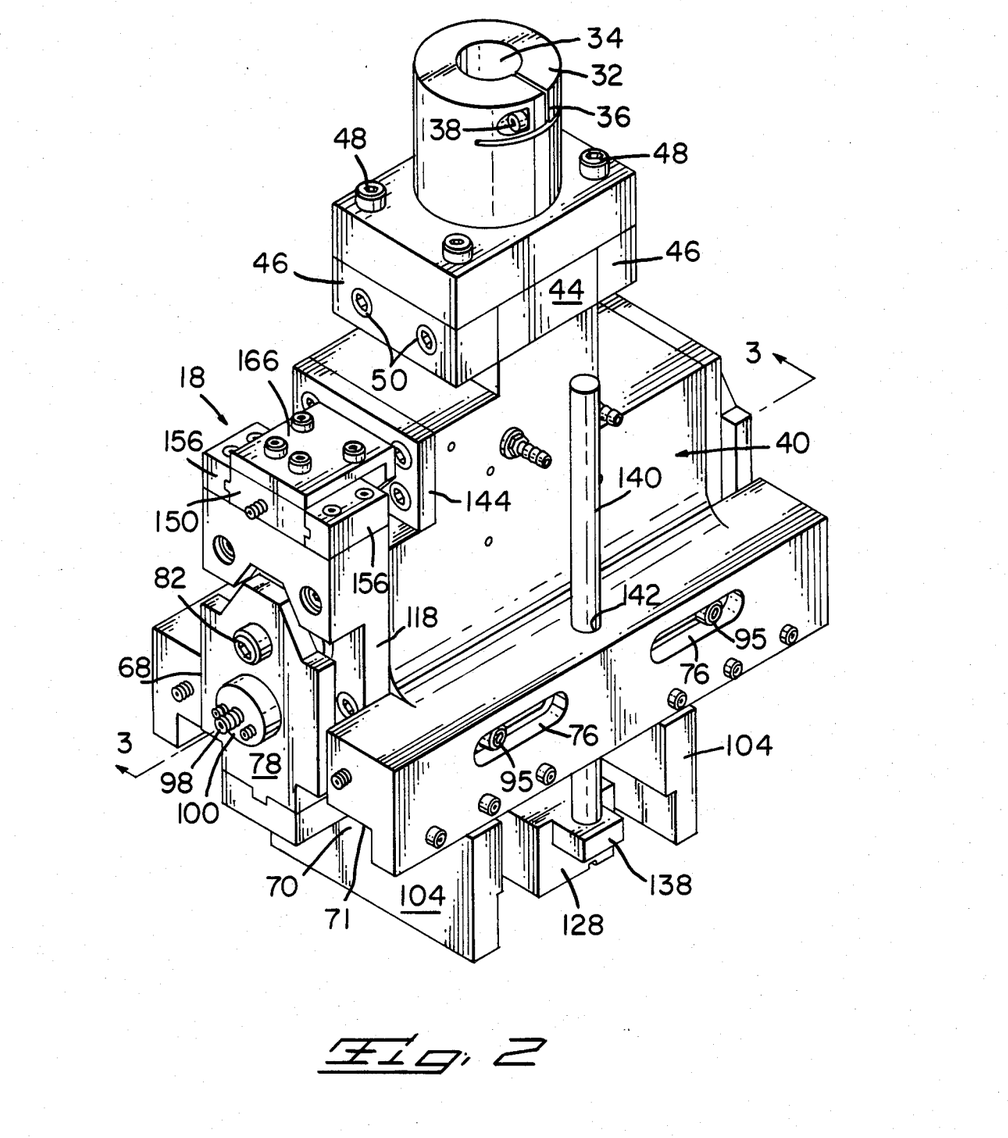
FIG. 2 is a perspective view of the gripper head.
Figure 12:
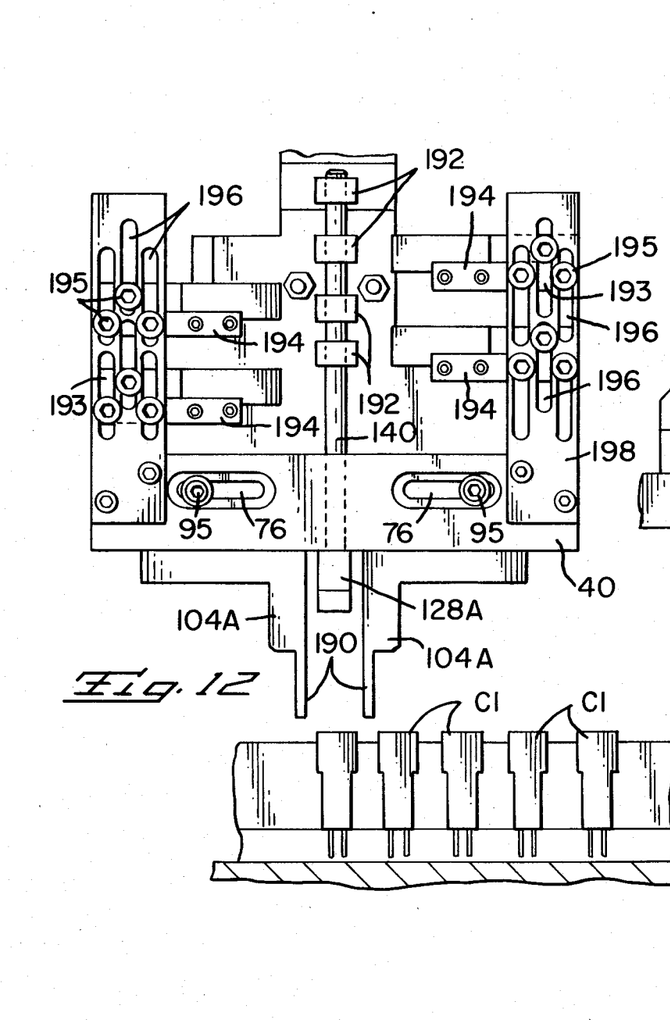
Figure 13:
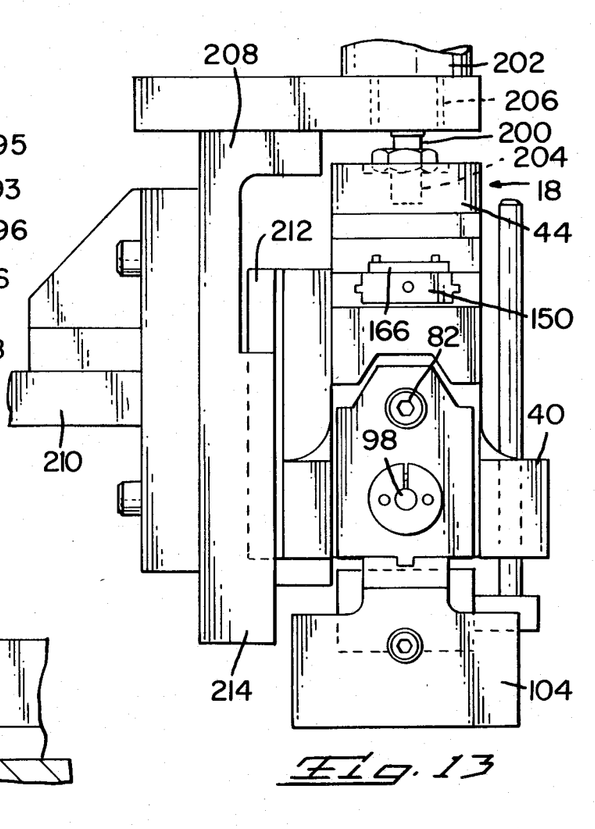

FIG. 12 is a side view of the gripper head in association with electrical connectors at a pick-up station and illustrating the certain modifications; and FIG. 13 is an end view of the gripper head in association with means adapting it for use with a non-robotic pick and place machine. As shown in FIG. 1, the robot machine 2 comprises a body 4 mounted for rotation about, and movement along, the axis of a vertical shaft 6 in a stand 8 secured to a work table 10. Mounted on the body 4 for rotation about a vertical axis, is a first arm 12 carrying at its end remote from the body 4, a second arm 14 which is rotatable relative to the arm 12, also about a vertical axis. A shaft 16 which is rotatable about a vertical axis and which is also extensible and retractable along such axis depends from the arm 14 at its end remote from the arm 12. The axis of the shaft 16 is known as the Z axis of the machine. The body 4 is clamped, prior to use of the machine 2, in a desired angular position, and in a desired vertical position, with respect to the shaft 6. The rotation of the arms 12 and 14, and the shaft 16, as well as the axial vertical movement of the shaft 16, are selectively controllable by means of a microprocessor (not shown) in accordance with a predetermined program.

A gripper head 18, according to an embodiment of the invention, is fixedly mounted on the shaft 16.

A workpiece support 20 on the table 10 supports and locates, in a fixed position thereon, a workpiece in the form of a printed circuit board 22. At respective positions on the work table 10, spaced from each other, and from the support 20, are pick-up stations 24 and 26 containing electrical connectors, to be mounted, at accurately predetermined positions, on the board 22. The station 24 contains connectors 28, the station 26 containing connectors 30, which are dimensioned differently to the connectors 28.

The machine 2 is operated under the control of the microprocessor to swing the head 18 over one of the pick-up stations, for example, the station 26, to lower the head 18, to engage the leading connector 30' at the station 26, to cause the head 18 to grip that connector, to raise the head 18, to swing it to a position over the board 22, to lower the head 18 to position the connector 30' on the board 22, to cause the head 18 to release the connector 30', to raise the head 18 and subsequently to cause the head 18 to pick up a connector from the station 24 and position it on the board 22, in a manner similar to that described above with reference to the picking up and placing of the connector 30', and so on. The program ensures that the head 18 is rotated about the vertical axis of the shaft 16 so that it is suitably oriented for each pick-up and place operation.

The head 18 will now be described in detail. As best seen in FIGS. 2 to 5, the head 18 comprises an adaptor 32 having a bore 34 for receiving the shaft 16 and being split at 36 to allow the insertion of the shaft 16 into the bore 34 and for the adaptor 32 then to be firmly secured about the shaft 16 by means of a screw 38 meshing with a thread in the adaptor 32. The adaptor 32 is attached to a main body 40 of the head 18 by way of intermediate blocks 42, 44, and 46, respectively, fixed to the adaptor by means of screws 48, said blocks being secured together by screws 50, and the block 44 being secured against the upper face 52 of the body 40 by means of screws 54 (see FIGS. 2 and 5). The body 40, which may be a casting, a machined part, or machined parts, defines cylinders 56, 58, 60, and 64 and a vacuum chamber 62. The lower part of the body 40 defines a channel 66, extending the full length of the body 40 and opening downwardly. Sidewalls 68 of the channel 66 define recesses 70 receiving crossed roller bearings 72. The channel 66 communicates with undercut grooves 74 extending parallel to the recesses 70 and being formed in the lower walls of the respective cylinders 56 and 58. The sidewalls 68 of the channel 66 are formed with counterbored, through slots 76 positioned above the recesses 70 and communicating with the grooves 74. The outer halves 72a of the bearings 72 are secured to horizontal walls 71 of the recesses 70, the inner halves 72a of the bearings 72 being secured to base plates 77 of respective jaw slides 78, one of which is received in each end of the channel 66. The slides 78 are thereby slidable, with low friction, longitudinally of the channel 66.

Each slide 78, which is L-shaped, also comprises a vertical back plate 80 to which is secured a piston rod 82 of a piston 84 in a respective one of the cylinders 56 and 58, which are arranged in horizontally opposed, spaced relationship in the body 40. The cylinder 56 in combination with its piston 84 and piston rod 82 constitutes a first double acting piston and cylinder unit, the cylinder 58 in combination with its piston 84 and piston rod 82, constituting a second double acting piston and cylinder unit.

Figure 10:
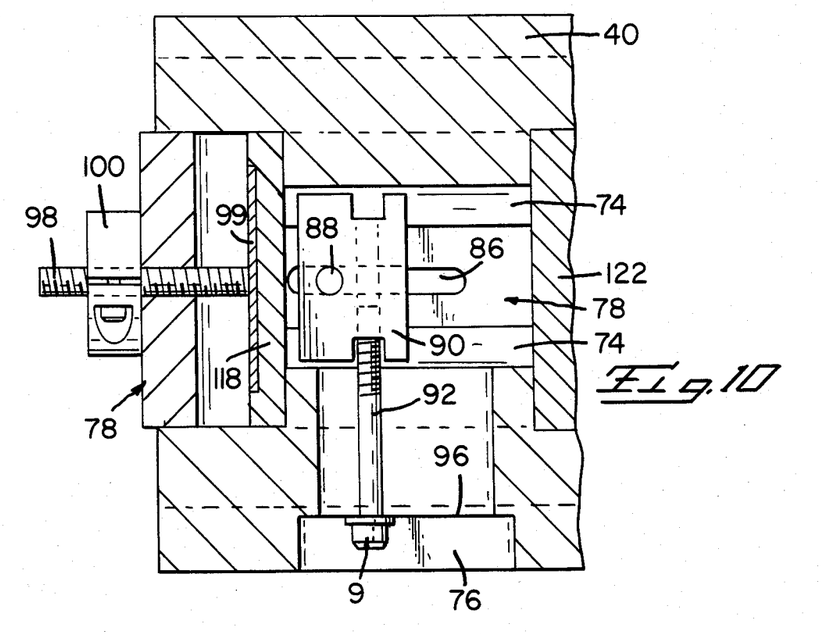
FIG. 10 is a view on the lines 10—10 of FIG. 4.

The base plate 77 of each slide 78 is formed with a central longitudinal slot 86 receiving a spigot 88 on a jaw slide outer end position adjuster block 90 which is of V-shaped corss-section and slidably engages in a respective one of the two grooves 74. A screw 92 projecting from each block 90, protrudes into a respective one of the slots 76, as best seen in FIG. 10. The head 95 of the screw 92 bears against the base of the counterbore of the slot 76 (as best seen in FIG. 10) when the screw 92 has been tightened, thereby to to secure the block 90 in a chosen position lengthwise of the groove 74. In the selected outer end position of each slide 78 the associated spigot 88 abuts an end surface 89 of the associate slot 86. A jaw slide inner end position adjustment screw 98 meshing with a through opening 102 in the plate 80 of each slide 78 can be secured in a chosen axial position relative to plate 80, by means of a threaded clamp collar 100. In the selected outer end position of each slide 78 the screw 98 abuts an associated pad 99 (see FIG. 4).

A gripper jaw 104 is readily removably secured to the base plate 77 of each slide 78 by means of screws 106 passed through a flange 108 of the jaw 104. Each jaw has a gripper portion 110 depending vertically from the flange 108 and being formed with a recess 112 for receiving an insert 114 (see FIGS. 3 and 4) readily removably secured to the portion 110 by means of a screw 116. The recesses 112 of the two jaws 104, face one another.

Figure 7:
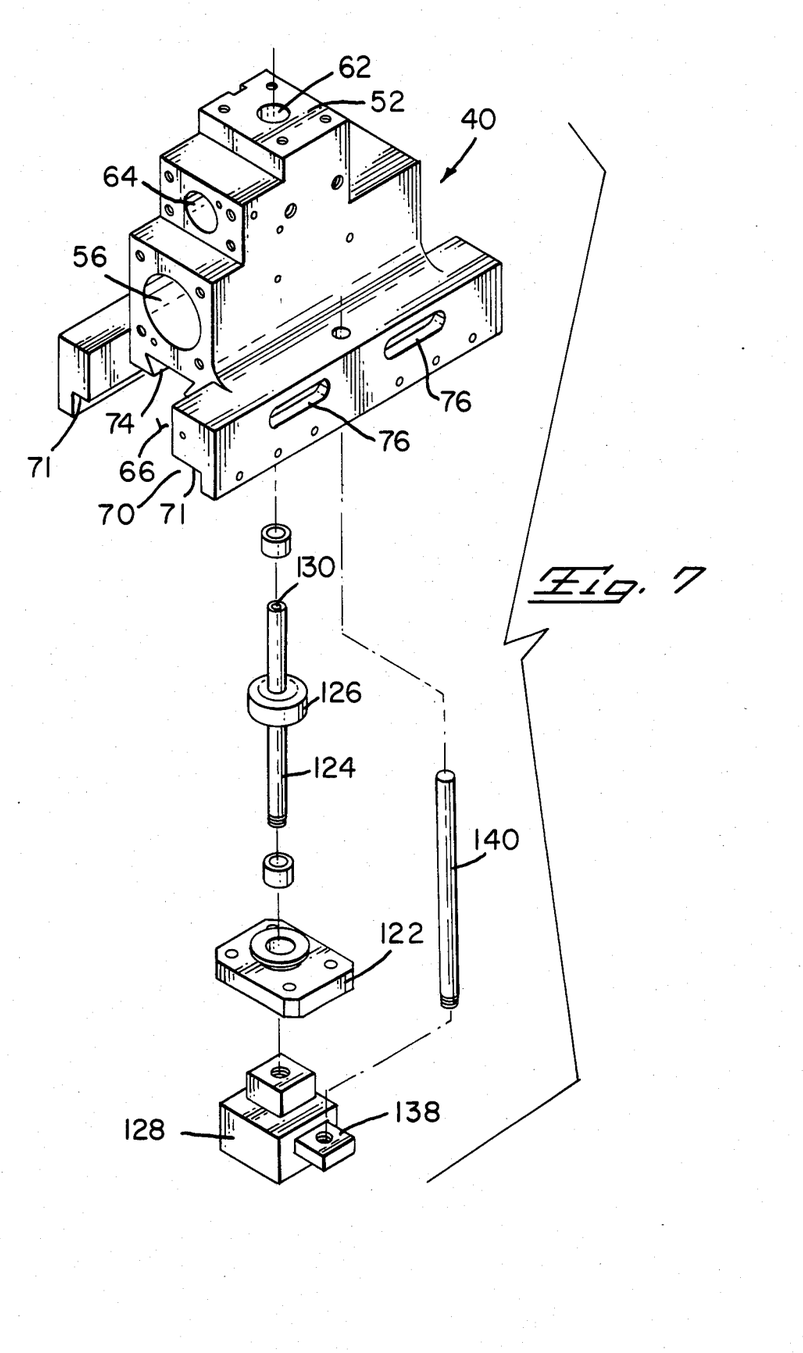
FIG. 7 is a similar view to that of FIGS. 5 and 6 but showing yet further parts of the gripper head exploded from the main body.

The cylinders 56 and 58 are closed by cylinder heads 118 and 120, respectively. The cylinder 60, which is closed by a cylinder head 122, has a piston 126 provided with a piston rod 124, the upper end of which projects into the vacuum chamber 62, and the lower end of which projects between the jaws 104, and is screwed into a hold down and tamper block 128, as best seen in FIG. 7. The axis of the rod 124 constitutes the central axis of the head 18 and body 40. The rod 124 has a through axial bore 130 which opens at its upper end into the chamber 62, the lower end of the bore 130 communicating with a manifold 132 in the block 128, opening into the lower face 134 thereof. A guide notch 136 also opens into the face 134. A flange 138 extending horizontally from the block 128 carries an anti-rotation guide rod 140 slidably received in a bore 142 in one side of the body 40, for the purpose of stabilizing the block 128 against rotation about the axis of the rod 124.

Figure 8A:
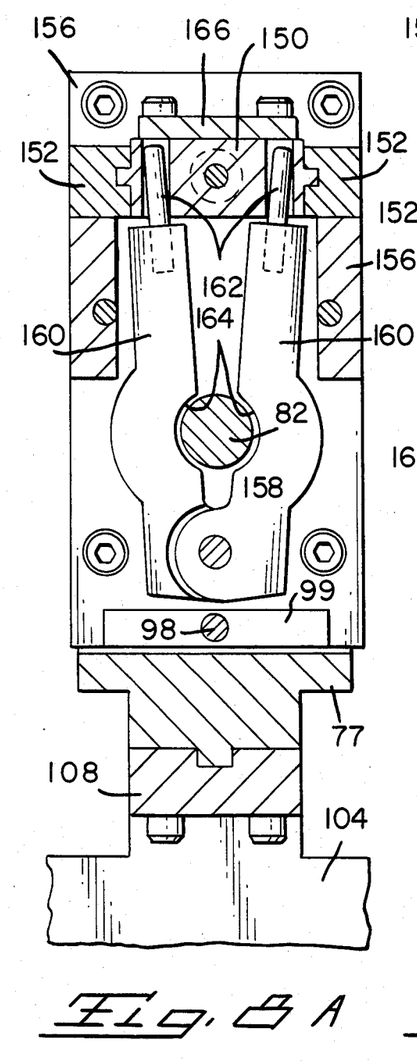
FIG. 8A is a view taken on the lines 8A—8A of FIG. 4, showing a pair of brake shoes of the gripper head in an open position.
Figure 8B:
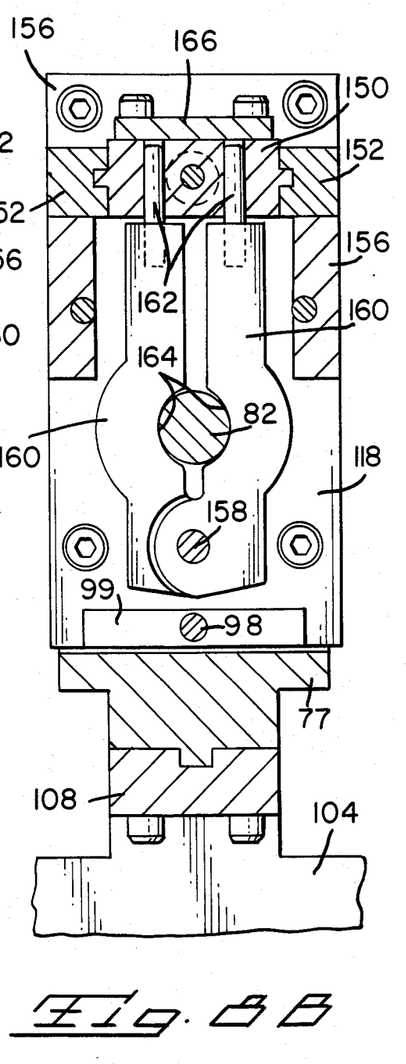
FIG. 8B is a similar view to that of FIG. 8A but showing the brake shoes in a closed position.
Figure 9:
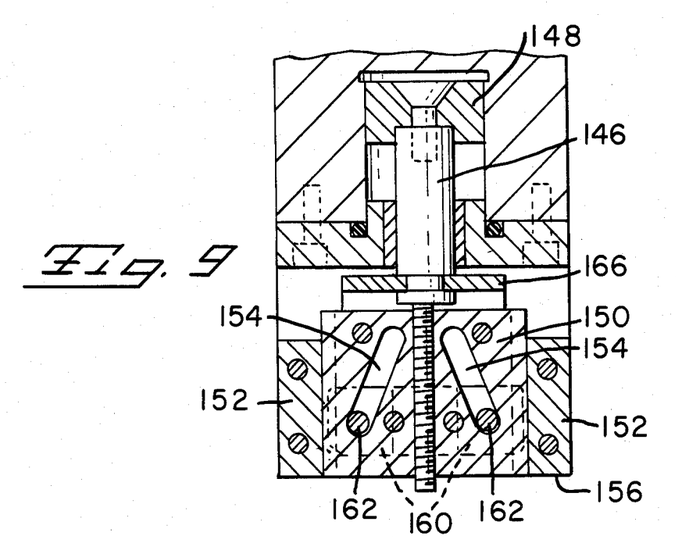
FIG. 9 is a view taken on the lines 9—9 of FIG. 4.

The cylinder 64 is closed by a cylinder head 144 through which passes a piston rod 146 attached at one end to a piston 148 in the cylinder 64 and at the other to a bracket 166 fastened to a brake cam slide 150 slidable in bearings 152, in the axial direction of the rod 146. The slide 150, which has a central adjusting screw 153, is formed with cam slots 154 which diverge from one another in a direction away from the piston 148 as shown in FIG. 9. The bearings 152 are mounted on a guide block 156 formed integrally with the cylinder head 118 to which are pivoted, on a pivot pin 158, a pair of brake shoes 160, surmounted by cam follower pins 162 engaging in respective ones of the slots 154 as shown in FIGS. 8A, 8B and 9. The piston rod 82 of the cylinder 56 extends through recesses 164 in the shoes 160, so that when the piston 148 is advanced, from its FIG. 9 position, the pins 162 are forced towards one another so that the shoes 160 are closed about the piston rod 82 as shown in FIG. 8B. The slide 150 is covered by an L-shaped plate 166 secured to the block 156.

Figure 11:
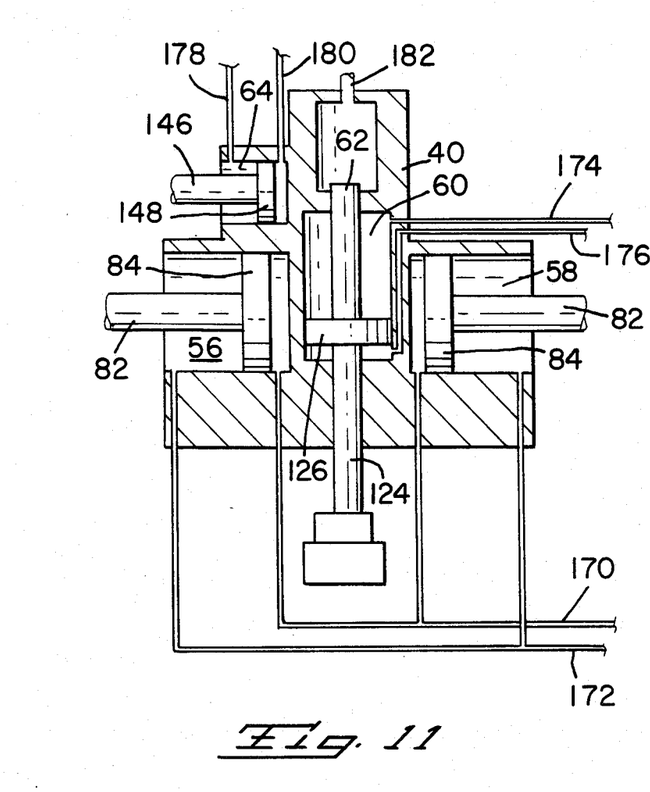
FIG. 11 is a fragmentary, diagrammatic, sectional view of the gripper head illustrating part of a pneumatic circuit thereof.

As shown in FIG. 11, the piston and cylinder units 56, 82, 84 and 58, 82, 84, are fed through common compressed air lines 170 and 172, the piston and cylinder unit 60, 124, 126, which is also double acting, being fed through compressed air lines 174 and 176, and the double acting piston and cylinder unit 64, 146, 148 being fed through compressed air lines 178 and 180. The chamber 162 can be evacuated through a line 182. All the piston and cylinder units are placed under pneumatic pressure through valves (not shown) operated by the microprocessor of the robotic machine 2 in accordance with its program, the chamber 62 being evacuated and filled, also through valves (not shown) under the control of the microprocessor and in accordance with its program.

Figure 3:
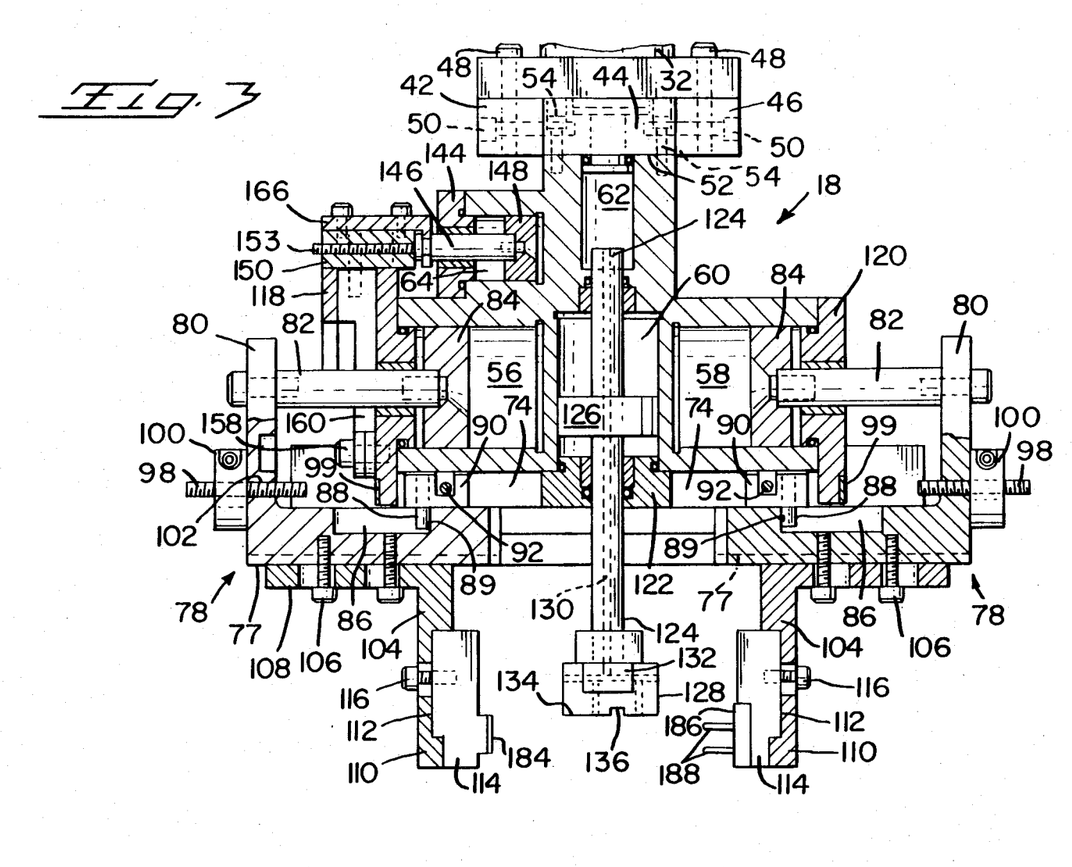
FIG. 3 is a view taken on the lines 3—3 of FIG. 2 showing jaws of the gripper head in an open position.
Figure 4:
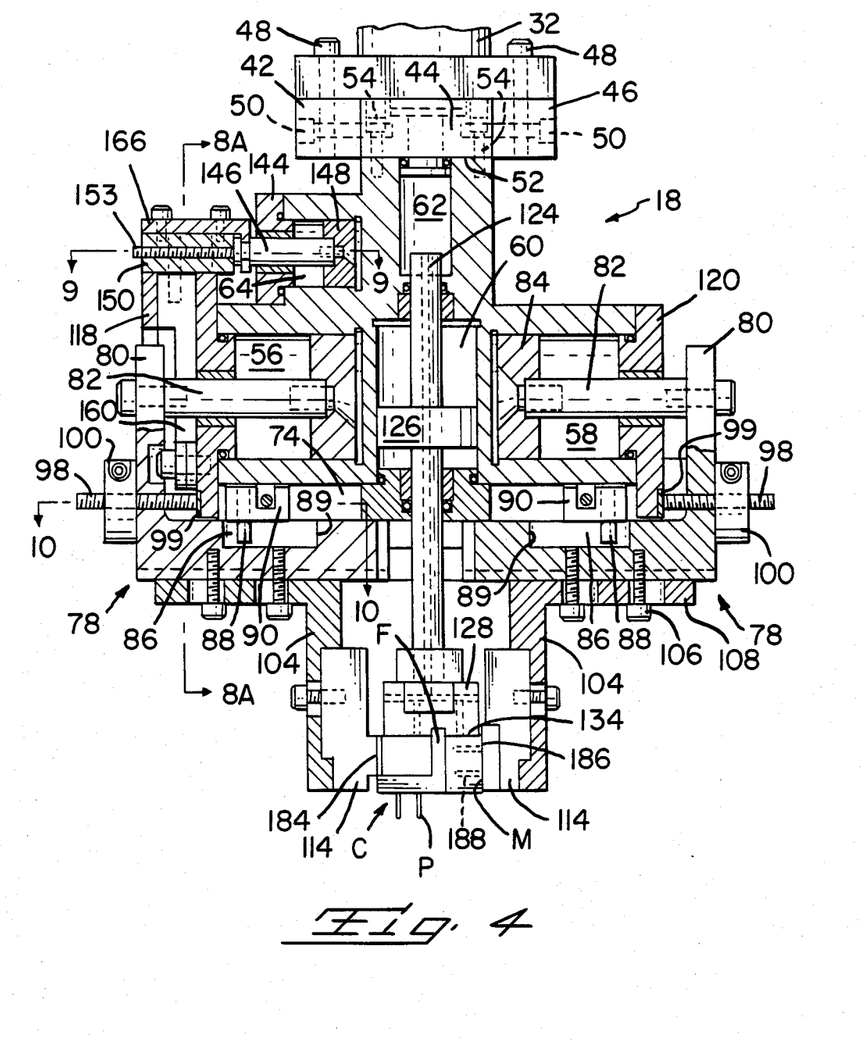
FIG. 4 is a similar view to that of FIG. 3, but showing the jaws in a closed position and gripping an electrical connector.
Figure 5:
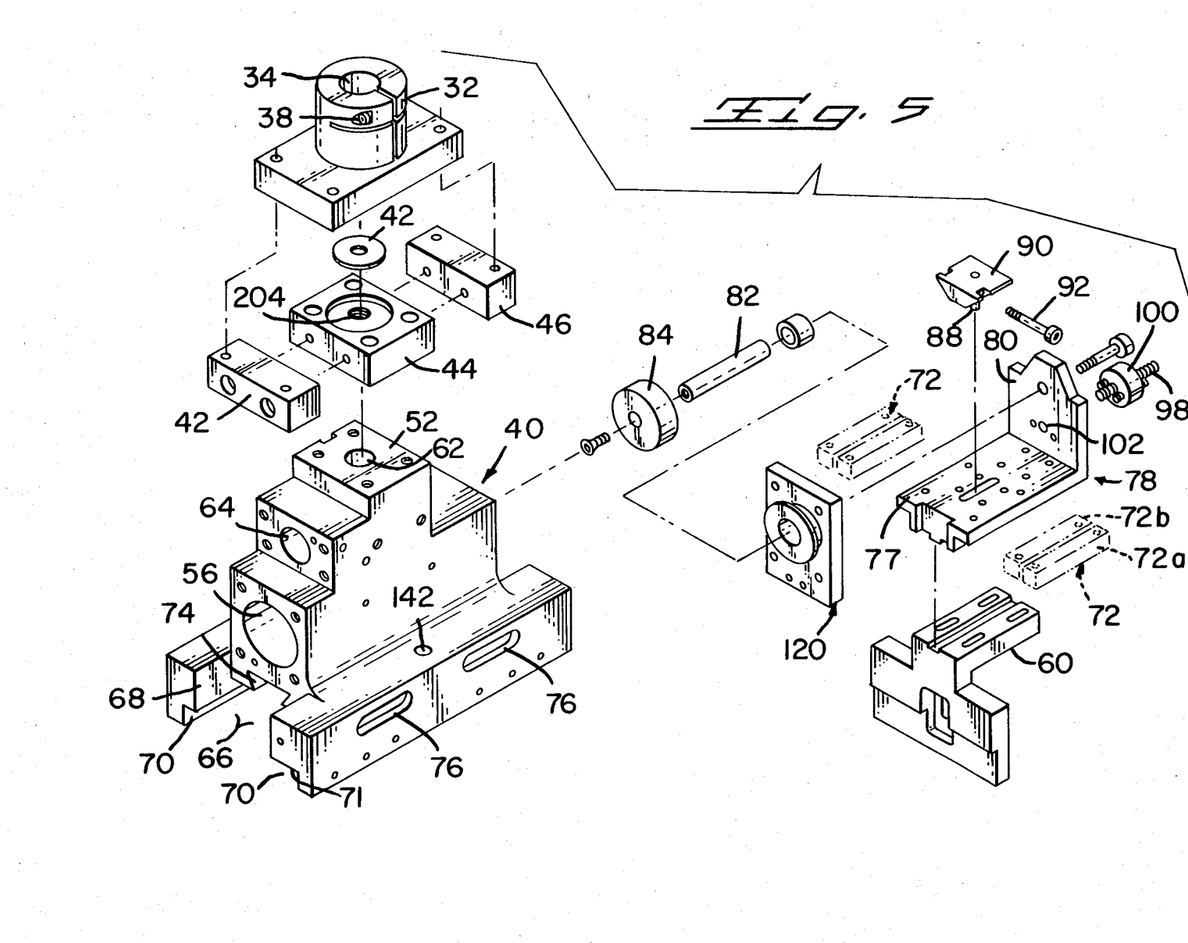
FIG. 5 is a perspective view showing parts of the gripper head exploded from a main body thereof.
Figure 6:
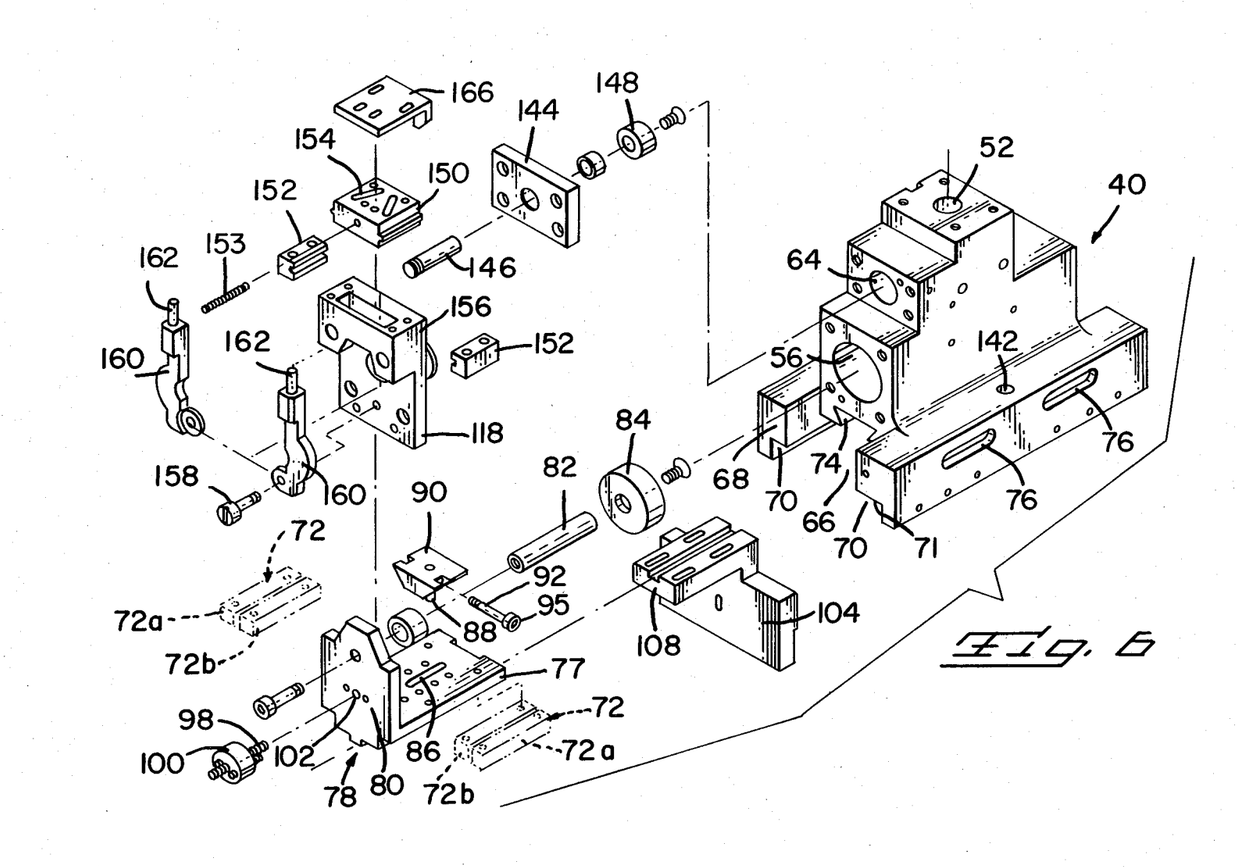
FIG. 6 is a similar view to that of FIG. 5 but showing other parts of the gripper head exploded from the main body.

One mode of operation of the head 18 will now be described with reference to an object which may be, for example, one of the connectors 28 or 30 shown in FIG. 1. It will be assumed for the purposes of the present example that the inserts 114 both have flat gripping surfaces without projections thereon. When the object is to be picked up from a pick-up station both of the pistons 84 are advanced, so that the slides 77 are driven away from one another, each to an extent limited by the position of the corresponding pin 88, as determined by the position of the associated slide 90 along its recess 74 (FIG. 3). At this time, the piston rod 146 is in its fully retracted position, so that the brake shoes 160 are clear of the piston rod 82 as shown in FIG. 8A. The piston 126 is in the position shown in FIG. 3, in which the hold-down and tamper block 128 is disposed between the inserts 114. The chamber 62 is unevacuated. The shaft 16 of the machine 2 is lowered so that the face 134 of the block 128 engages the top of the object to be picked up and holds it in position whilst the jaws 104 are closed there towards by retraction of the pistons 84 (FIG. 4). The piston and cylinder unit 64, 146, 148 is now actuated to advance its piston rod 146 so that the brake shoes 160 are applied to the piston rod 82 so that the left hand (as seen in FIGS. 3 and 4) jaw 104 is locked in a position adjacent to the object to be picked up, the other jaw 104 being applied by the unit 58, 82, 84 against said object. The shaft 16 of the machine 2 is now retracted and the object, now securely gripped between the jaws 104 is raised from the pick up station. Additionally, to secure the object in position between the jaws 104, against the lifting movement of the shaft 16, which will, in practice, be very rapid, the chamber 62 may be evacuated at this time so that the object is drawn against the block 128. The arms 12 and 14 of the machine 2 are now swung horizontally, so as to position the head 18 over a predetermined part of the workpiece. Although these movements are likely also be extremely rapid, the jaws 104 cannot be shifted, with respect to the body 40, since the left hand jaw 104 is securely locked in position relative to the body 40 by the application of the brake shoes 160 to the piston rod 82 of the unit 56, 82, 84, and the other jaw is held tightly against the object by the unit 58, 82, 84.

The shaft 16 is now lowered to move the object towards its predetermined position on the workpiece. When the object reaches the workpiece, the jaws are opened as the piston rod 124, and thus the block 128, are advanced, so that the component is tamped down against the workpiece. If it was previously evacuated, the chamber 62 is now filled and the shaft 16 of the machine 2 is raised again so that the head 18 is lifted, leaving the object on the workpiece. Where the object is an electrical connector, having depending pins for insertion in holes in a printed circuit board constituting the workpiece, the tamping action of the block 128 drives the pins into these holes.

There will now be described another mode of operation of the head 18, which mode is specifically illustrated in FIGS. 3 and 4, and which may be employed, where, for example, the workpiece is in the form of a female electrical connector of C, of the right-angle type, that is to say a connector in which pins P for reception in holes in a printed circuit board extend at right angles to the direction in which a male electrical connector (not shown) can be inserted into a cavity in a mating face M of the connector C. For this mode of operation, one of the inserts 114 is provided with a planar gripping surface 184, as shown in FIGS. 3 and 4, the other insert 114 being provided with a plane planar gripping surface 186, from which test and/or guide pins 188 extend at right angles, also as shown in FIGS. 3 and 4.

In order to load such a connector into the jaws at a pick-up station, the jaws are maintained in an open position, and the head 18 is lowered so that the jaws straddle the connector C between the surfaces 184 and 186. The rod 124 is then extended so that the surface 134 of the block 128 engages the top of the connector C holding it against the pick-up station. The chamber 62 may be evacuated to assist this. A flange F on the connector C engages loosely in the notch 136 in the head 128. The jaws 114 are now closed so that the pins 118 enter the cavity in the mating face M and serve to locate the connector C with respect to the jaws and the block 128, the plane surfaces 184 and 186 then bearing against the connector C as shown in FIG. 4, so that it is gripped there between.

When the connector C is to be placed on the printed circuit board 22. The shaft 16 of the machine 2 is lowered and the connector C is moved towards and against the board 22 so that all the pins P are driven into the holes therein. With the block 128 still in contact with the connector C, the jaws are opened, and if it has been evacuated, the chamber 62 is placed under light pressure. The block 128 is then raised and the head 16 is raised by the shaft 16 of the machine 2.

As the jaws 104 are only screwed to the slides 77, the jaws 104 are readily exchangeable so as to adapt the head 18 to the requirements of different pick and place operations.

As shown in FIG. 12, for example, the jaws 104A may be provided with small width gripping portions 190 for use in picking up, objects in the form of connectors C1, for example, arranged in closely spaced relationship, or for placing them on a workpiece in closely spaced relationship. In this case, the block 128 on the piston rod 124 may be exchanged for a different block 128A which is dimensioned in accordance with the objects to be picked up and placed.

Also as shown in FIG. 12, the anti-rotation guide rod 140 may be provided with reflectors 192, spaced there along, for cooperation with respective reflected beam optical sensors 194 projecting from connector blocks 193 secured to plates 198 fixed to the body 40. The blocks 193 are secured to the plates 198 by means of screws 195 which are adjustable longitudinally of slots 196 in the plates 198, so that the sensors 194 can be placed in selected vertical positions. The sensors 194 cooperate with the reflectors 192 to sense the vertical position of the rod 140, and thus of the hold down and tamper block.

If, for example, a connector C1 is picked up by the jaws 104A, with the jaws placed under a certain clamping pressure, the head 18 is moved by the machine 2 into position above the workpiece and the shaft 16 is lowered and is then stopped so that the ends of the pins of the connector C1 are a short distance above the workpiece, the connector can be driven home by the block 128A, after reducing the clamping pressure between the jaws, the insertion force being small enough not to cause the pins to be bent or the workpiece to be damaged. If, as a result of a malformation of a connector or other object to be placed on a workpiece, it is incorrectly placed on the workpiece, or, pins or other elements on the workpiece are not properly inserted into holes therein, the hold down and tamper block will not be driven by the piston rod 124, to its intended downward end position. In this case, a sensor 194 which has been adjusted to detect such end position will not be actuated by reflection from the corresponding reflector 192 and will thereby signal a malfunction. A signal indicative of this malfunction is fed to the microprocessor of the robotic machine 2, to cause the head 18 to lift the malformed object from the workpiece and to discharge it at a waste discharge station (not shown). Where the program of the machine 2, calls for the placing of objects of different heights, an appropriately adjusted sensor 194 is provided for each such object. The sensors are selectively brought into operation, or are selectively read, in accordance with the program.

As shown in FIG. 13, the head 18 may be adapted for use, instead of with a robot machine, with some other pick and place machine (not shown) which does not comprise means for raising and lowering the head 18. In this case, the adaptor 32 is removed, and the piston rod 200 of a pneumatic piston and cylinder unit 202 is screwed into a tapped central opening 204 (also see FIG. 5) in the block 44. The unit 202 is assembled to a bracket 208, with the piston rod 200 extending freely through an opening 206 therein. The bracket 208 is adapted to be bolted to an arm 210 of said other machine. The piston rod 200 performs an equivalent function to that of the shaft 16 of the machine 2. The arm 210 may be driven by that machine in horizontal, rotary or reciprocating movement. The body 40 is provided with bearings 212 for cooperation with bearings 214 on the bracket 208 to permit smooth vertical sliding movement of the head 18 with respect to the bracket 208 as the piston rod 200 is advanced and retracted.

The cylinders 56 and 58 may be provided with independent, instead of common, air lines, so that the jaws 104 can be moved in their closing or the opening directions independently of each other and so that different pressures can be applied to the respective pistons 84. In this case, if the screw 98 associated with the right hand jaw 104, for example, is adjusted to stop that jaw at a given position in its closure direction, and if a somewhat higher pneumatic pressure is applied to the cylinder 58 to ensure that the screw 98 will always engage the associated cylinder head 120, this position of the jaw 104 can be used as a reference position for the external gripping of an object. If the jaws are to be inserted into a cavity in the object and are to be opened internally to grip it, the slide 90 associated with the right hand jaw 104 can be adjusted by means of its screw 92, so that the jaw 104 stops at a given position in its opening direction, a somewhat higher air pressure being applied to the cylinder 58 to ensure that the spigot 88 of the slide 90 associated therewith will always be abutted by the associated surface 89 of the jaw slide 78. The outer surface of the left hand jaw 104 can then be used as a reference surface.

The screw 98 and the slide 90 of the right hand jaw 104 may be adjusted so that this jaw is always held stationary and cannot move at all. In this case, both the inner and outer surfaces of the right hand jaw 104 can be used as reference surfaces, as required, for external or internal gripping operations, the left hand jaw 104 being used to provide for gripping and release of the object.

The travel of each jaw 104 may be adjusted to allow for the pick up and the release of objects in confined spaces.

Where the cylinders 56 and 58 are supplied through common air lines 170 and 172 as shown in FIG. 11, both of the jaws 104 will move in their opening or their closing directions, at least substantially, simultaneously as pressure is applied to the pistons 84. In this case, if an object to be picked up is prevented from moving by applying the hold-down and tamper block 128 thereto, the jaws 104 will adjust automatically to deviations of the object from the centerline of the piston rod 124 and clamp it in that position. Thus by braking the piston rod 82 of the piston and cylinder unit 56, 82, 84 by means of the brake shoes 160, before releasing the block 128 from the object, the object can be transferred in its deviant position to the workpiece. The programming of robotic and other pick and place machines can thus be simplified in that the Z or vertical axis of such a machine can be programmed onto the origin of imaginary Cartesian coordinate systems of the workpiece or connector, for example, the hole pattern of a printed circuit board and the pin pattern of the connector, since the brake ensures that the object cannot shift relative to said center line as a result of rapid translatory movements of the head 18.

As described above, with reference to FIGS. 3 and 4, the jaws 104 and the block 128 may be used in order to center the component with respect to the Z axis of the machine, that is to say the longitudinal axis of the piston rod 124.

The head 18 as described above, is extremely versatile and can, without exchanging the jaws 104 pick-up and place objects of very substantially varying dimensions, the exchangeability of the jaws 104 and the inserts 114, adding to the range of differently dimensioned objects that the robot or the pick and place machine can be programmed to handle.

We claim:

1. A gripper head for use in picking up objects and placing them in predetermined positions, comprising:
   a body having a central axis and means for attaching the body to a longitudinally moveable shaft, with said central axis coincident with the axis of the shaft;
   first and second piston and cylinder units, arranged in the body in opposed relationship, one on each side of said central axis;
   first and second jaws, one disposed on each of two opposite sides of said central axis, each jaw being connected to, and slidably drivable by, the piston of a respective one of said units, along a path of travel in a direction towards and away from said central axis, each jaw projecting from the body in a direction away from said attachment means;
   a hold-down and tamper member;

means in the body for driving said member between said jaws and in a direction towards and away from said attachment means; and means for retaining at least one of the jaws in a predetermined position along said path of travel, said retaining means being in the form of a brake, means being provided for applying the brake to the piston of one of said units.

2. A gripper head according to claim 1, in which said brake comprises a pair of brake shoes between which a piston rod of said first unit extends, and a third piston and cylinder unit in the body, actuatable to close the brake shoes about said piston rod.

3. A gripper head according to claim 2, in which each brake shoe carries a pin projecting into a slot formed in a brake slide connected to the piston of the third piston and cylinder unit, the slots diverging from one another in a direction away from such piston.

4. A gripper head for use in picking up objects and placing them in predetermined positions, comprising:
- a body having a central axis and means for attaching the body to a longitudinally moveable shaft, with said central axis coincident with the axis of the shaft;
- first and second piston and cylinder units, arranged in the body in opposed relationship, one on each side of said central axis;
- first and second jaws, one disposed on each of two opposite sides of said central axis, each jaw being connected to, and slidably drivable by, the piston of a respective one of said units, along a path of travel in a direction towards and away from said central axis, each jaw projecting from the body in a direction away from said attachment means;
- a hold-down and tamper member;
- means in the body for driving said member between said jaws and in a direction towards and away from said attachment means; and
- means for retaining at least one of the jaws in a predetermined position along said path of travel, and in which the means for driving said hold down and tamper member comprises a further piston and cylinder unit disposed between said first and second units, and having a piston rod which is coaxial with said central axis and which carries said hold down and tamper member at one end, the piston rod having a through axial bore communicating with an evacuable chamber, and with a manifold in said member, passages in said manifold communicating with a face of a hold-down and tamper member which is directed away from said body.

5. A gripper head as claimed in claim 1, comprising means for predetermining the length of travel of each jaw both towards and away from said central axis.

6. A gripper head according to claim 5, in which each jaw is carried by a first slide connected to a piston rod of a respective one of said first and second units, the slide having a slot extending in the direction of travel of the jaw and receiving a stop secured to a second slide which is securable in a predetermined position lengthwise of said direction of travel, the first slide being provided with a stop projecting towards the body and being adjustable to predetermine the extent of a space between the stop and the body.

7. A gripper head according to claim 1, in which each jaw is mounted on a slide which is connected to the piston of a respective one of said first and second units, the jaw being detachably secured to the slide.

8. A gripper head according to claim 1, in which each jaw is provided with a recess receiving an insert having an object engaging face and being detachably secured to the jaw.

9. A grippr head as claimed in claim 8, in which the insert of one jaw is provided with a pair of alignment pins projecting from the object engaging face of the insert, towards said central axis.

10. A gripper head as claimed in claim 1, in which the hold-down and tamper member is detachably connected to said driving means.

11. A gripper head as claimed in claim 1, in which said attachment means comprises a resilient portion defining a bore for receiving said shaft, and means for partially closing said bore so that the shaft is gripped by the attachment means.

12. A gripper head as claimed in claim 1, in which said hold-down and tamper member is mounted on a driven shaft and has thereon an anti-rotation rod extending parallel to such shaft and being slidable in a bore in the body, means being provided for sensing the axial position of the anti-rotation rod when the hold-down and tamper member is in a predetermined position remote from said body.

13. A gripper head as claimed in claim 1, in which said longitudinally movable shaft is connected to a piston of a further piston and cylinder unit mounted on a bracket in which the gripper head is slidable along said central axis, towards and away from said further piston and cylinder unit, the bracket having means for its attachment to an arm of a pick and place machine.

14. A gripper head as claimed in claim 1, in which the body defines the cylinders of said first and second piston and cylinder units and cylinders of third and fourth piston and cylinder units, the cylinder of the third piston and cylinder unit extending between the cylinders of said first and second units and containing a piston connected to a piston rod for driving said hold-down and tamper member, the cylinder of the fourth piston and cylinder unit extending parallel to that of the fist and second piston and cylinder units and having a piston to actuate a brake means for braking the piston of the first piston and cylinder unit.

15. A gripper head for use in picking up an electrical connector having pins depending therefrom and moving the connector towards a printed circuit board to insert the pins in predetermined holes therein, the gripper head comprising:
- a body having a central vertical axis and having at its upper end, an adaptor extending about said axis for attaching the body to a vertically moveable shaft;
- first and second piston and cylinder units arranged in the body in opposed relationship, one on each side of said central axis;
- first and second jaws mounted on the body for horizontal sliding movement, towards and away from said axis;
- means connecting each jaw to a piston rod of a respective one of said first and second units;
- a third piston and cylinder unit disposed in the body and having a piston rod extending vertically, such piston rod having an axial through bore;
- an evacuable chamber defined by the body at a position above the cylinder of the third piston and cylinder unit and receiving the upper end of the piston rod thereof;
- a connector hold-down and tamper block mounted on the lower end of the piston rod of said third unit and having a downwardly directed connector engaging face formed with perforations communicating with said axial bore;

a fourth piston and cylinder unit to actuate a brake means for braking the piston rod of the first piston and cylinder unit; and means for supplying fluid under pressure to the cylinders of said piston and cylinder units.

16. A gripper head as claimed in claim 15, in which the means for applying pressure fluid to the cylinders of said first and second units are common to both of these units.

17. A gripper head as claimed in claim 15, in which the means for applying pressure fluid to the cylinders of said first and second units are separate means.

* * * * *